(12) United States Patent
Brixius et al.

(10) Patent No.: US 7,092,788 B2
(45) Date of Patent: Aug. 15, 2006

(54) TRANSPORT SYSTEM FOR ARTICLES, IN PARTICULAR CONTAINERS FOR BAGGAGE PIECES

(75) Inventors: Wolfgang Brixius, Neunkirchen A.Br (DE); Dominik Graefer, Dortmund-Wellinghofen (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/822,194

(22) Filed: Apr. 9, 2004

(65) Prior Publication Data

US 2004/0200693 A1    Oct. 14, 2004

(30) Foreign Application Priority Data

Apr. 14, 2003    (DE) ................................. 103 17 135

(51) Int. Cl.
    *G06F 7/00*    (2006.01)
(52) U.S. Cl. .................... 700/229; 700/230; 198/465.1
(58) Field of Classification Search ................ 700/225, 700/228, 229, 230; 198/465.1
    See application file for complete search history.

(56) References Cited

U.S. PATENT DOCUMENTS 5,367,552 A * 11/1994 Peschmann .................. 378/57
5,676,514 A * 10/1997 Higman et al. ............. 414/339
6,279,721 B1 * 8/2001 Lyngso et al. ........... 198/369.2
6,580,046 B1   6/2003 Koini et al.
6,607,066 B1 * 8/2003 Andersen et al. ...... 198/370.04
6,745,520 B1 * 6/2004 Puskaric et al. ................ 52/64
6,789,660 B1 * 9/2004 Bruun et al. ............. 198/347.1
6,888,460 B1 * 5/2005 Ambrefe, Jr. ................ 340/541

FOREIGN PATENT DOCUMENTS

DE            29809227 U1    2/1999
DE           199 31 756 A1    1/2001
DE           199 34 095 A1    1/2001
EP            1094018 A1 *    4/2001

* cited by examiner

*Primary Examiner*—Khoi H. Tran
(74) *Attorney, Agent, or Firm*—Henry M. Feiereisen

(57) ABSTRACT

A transport system, in particular an airport baggage handling system, includes a container for receiving an article, a sensor assembly including an inductive sensor for monitoring a transport of the container along a transport path, and a screening device for completely scanning the article within the container together with the container. The container is provided with a marking in the form of a doped zone or a metal element so attached to the container body as to pass the sensor assembly in its response range for detection of the container. The container body is hereby constructed to allow scanning of the article together with the container body.

16 Claims, 3 Drawing Sheets

TRANSPORT SYSTEM FOR ARTICLES, IN PARTICULAR CONTAINERS FOR BAGGAGE PIECES

CROSS-REFERENCES TO RELATED APPLICATIONS

This application claims the priority of German Patent Application, Ser. No. 103 17 135.5, filed Apr. 14, 2003, pursuant to 35 U.S.C. 119(a)–(d), the disclosure of which is incorporated herein by reference.

BACKGROUND OF THE INVENTION

The present invention relates to a transport system, in particular to an airport baggage handling system, and to a container for transport of an article, in particular a baggage item.

Airport baggage handling systems are known, using containers or trays which receive the baggage items and are transported by conveyor belts along a transport path. Optical sensors, in particular light barriers, are hereby used for control purposes. The sensors detect the containers as they pass by on the transport path. For safety reasons, all or some bags on the transport path are subjected to X-ray screening. During the course of transport, rough handling and wear of conveyor belts and of container bags may result in contamination by rubbed-off particles and dirt that deposit on the optical sensors. As a consequence, the screening operation will be impaired, unless the sensors are frequently cleansed to ensure a reliable operation of the transport system.

It would therefore be desirable and advantageous to provide an improved transport system which obviates prior art shortcomings and includes baggage containers suitable for X-ray screening, including complete screening of baggage items or like articles loaded onto the containers, and which requires little maintenance while still being reliable in operation.

SUMMARY OF THE INVENTION

According to one aspect of the present invention, a transport system, in particular an airport baggage handling system, includes a container for receiving an article, a sensor assembly including an inductive sensor for monitoring a transport of the container along a transport path, and a screening device for complete scanning of the article, received in the container, together with the container.

The present invention resolves prior art problems by using a sensor technology with inductive sensors to detect the containers and a screening device that allows complete examination of the articles as well as the containers loaded with the articles. Inductive sensors are inexpensive to make and insensitive to dirt and thus require little maintenance. Suitably the containers are so constructed with respect to shape, material and structure as to allow complete scanning of articles transported by the containers. Thus, the articles can be reliably scanned, without interference from the containers, and can easily be checked during their transport in the containers. In other words, the need for a time-consuming unloading and reloading of articles and in-between screening operation is eliminated.

According to another feature of the present invention, the container may include a marking in the form of a doped zone which is so disposed on the container as to pass the sensor assembly in its response range. In this way, the sensors are assured to detect the containers. Suitably, the dopant has an effective atomic number smaller than 6.5. As a consequence, the articles can be reliably screened, without interference from the dopant. The dopant may be an element selected from the group consisting of lithium (Li), beryllium (Be), carbon (C), boron (B), or a mixture thereof.

As an alternative, the container may include a marking in the form of a metal element which is so disposed on the container as to pass the sensor assembly in its response range. The use of a metal element assures a response by the inductive sensors when the containers pass by. The metal element may be configured in the form of a band arranged on an underside of the container in a region of its outer edge. In this way, the articles transported by the containers can completely be screened. A possible formation of a "visible shadow" by the bands during the screening operation is then located outside the article or article being checked.

According to another feature of the present invention, the container may have a trough-shaped configuration such that a lowest point of the article, as viewed in a vertical direction, is located above the metal element. This configuration prevents the formation of a "visible shadow" by the bands.

According to another aspect of the present invention, a container for receiving an article for movement along a transport system, in particular airport handling system, includes a container body for receiving an article, wherein the container body has a marking so attached to the container body as to pass a sensor assembly in its response range for detection of the container body, with the container body being constructed to allow complete scanning of the article together with the container body.

According to another feature of the present invention, the marking may be implemented as a doped zone applied on the container body, or as a metal element attached to the container body.

According to another feature of the present invention, the container body may have an underside formed with two sidewalls extending in a transport direction and bounding a grooved passageway extending in the transport direction for engagement by a driving and guide unit which bears upon at least partial areas of the sidewalls, wherein the two sidewalls are curved mirror-symmetrically. The sidewalls of the passageway may hereby be outwardly curved mirror-symmetrically to define a greatest distance between the sidewalls in mid-section of the sidewalls, or they may be inwardly curved mirror-symmetrically to define a smallest distance between the sidewalls in mid-section of the sidewalls.

Suitably, the sidewalls are curved outwardly mirror-symmetrically at a radius which corresponds to a curve radius of a curved conveyor section.

According to another feature of the present invention, the sidewalls of the grooved passageway may extend perpendicular to a bottom side of the container body.

According to another feature of the present invention, the sidewalls of the grooved passageway may be positioned as mirror images in inclined relationship to form a configuration of the passageway in downwardly expanding direction.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
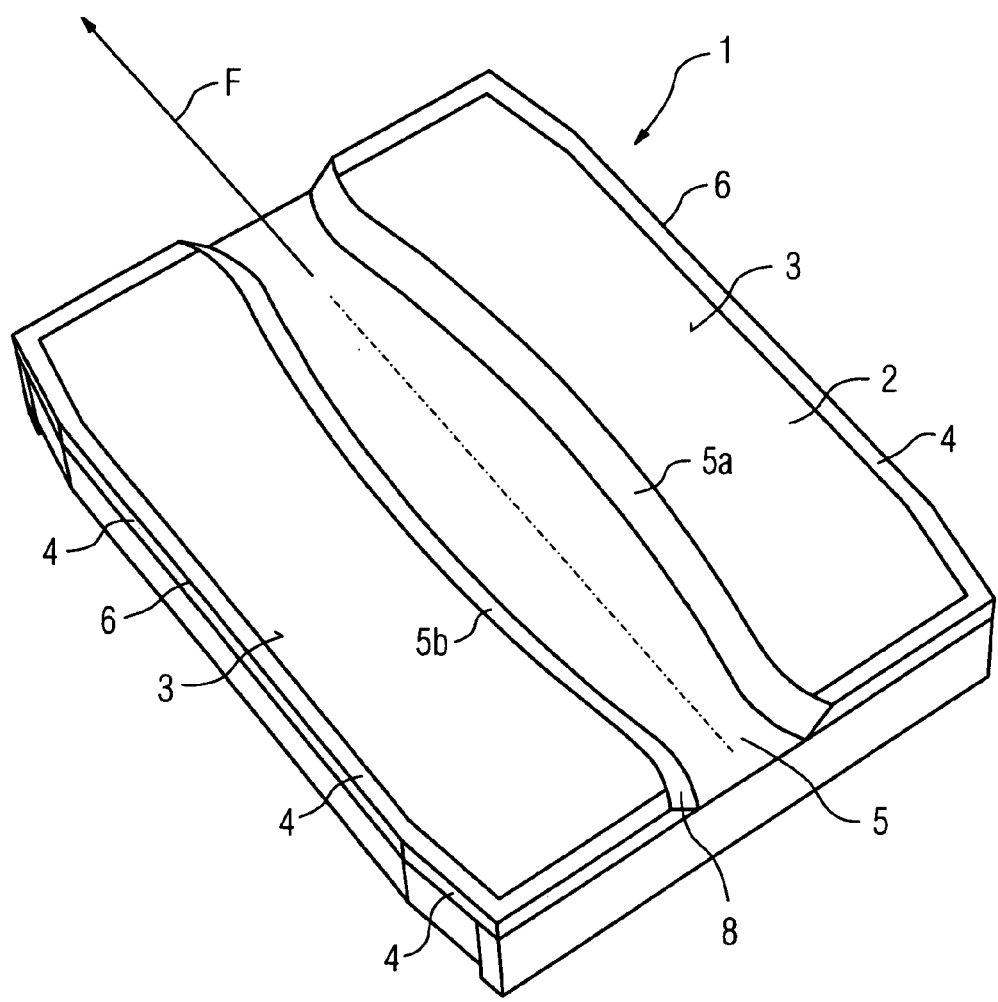
FIG. 1 is a bottom and side perspective illustration of one embodiment of a container according to the present invention.

Turning now to FIG. 1, there is shown a bottom and side perspective illustration of a container or tray according to the present invention, generally designated by reference numeral 1, for transport of an article, such as a baggage item along a not shown baggage handling system in an airport. The container 1 has a container body with a topside with an inwardly arched surface (trough or cup-shaped opening) which receives the baggage item and holds it securely and stably, as the container 1 is moved by the baggage handling system. As the container 1 is shown in the FIG. 1 from the below, the topside thereof is not visible.

Figure 3:
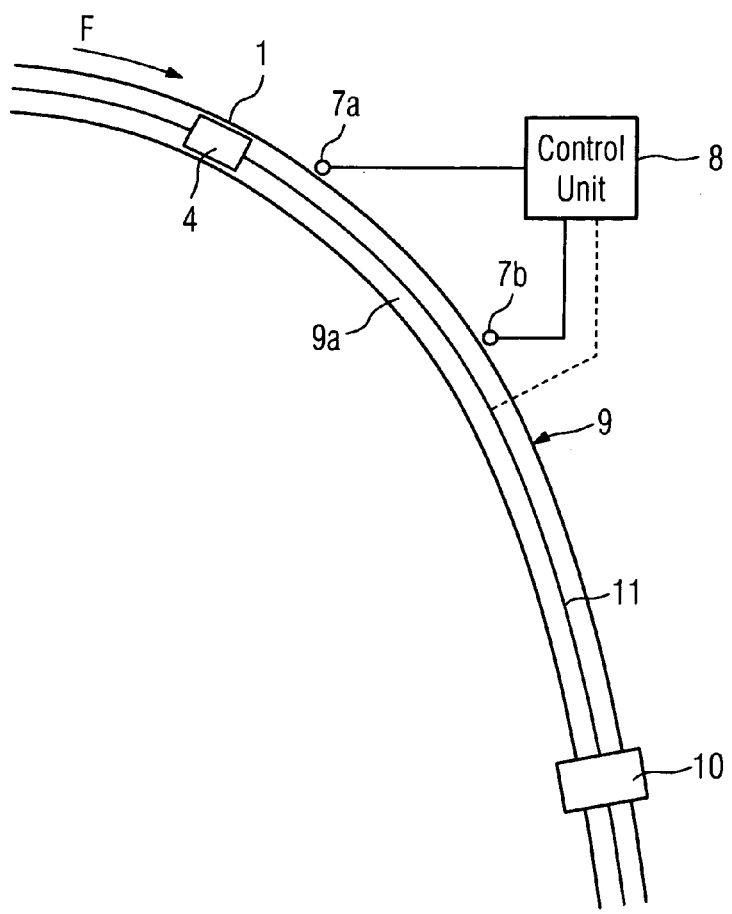
FIG. 3 is a schematic illustration of a control process for transport of the container along a transport path.

As shown in FIG. 1, the container body of the container 1 has a bottom 2 with an underside 3 which is formed with two sidewalls 5a, 5b to bound a passageway 5 in the form of a groove which extends in transport direction as indicated by arrow F and cooperates with at driving and guide engagement assembly 11 of a conveyor (not shown). as shown schematically in FIG. 3. A specific construction and manner in which the driving and guide engagement assembly is operatively and functionally incorporated into the transport system of the present invention is fully described in commonly owned U.S. patent application Ser. no. 10/789, 198, filed Feb. 27, 2004, the entire specification and drawings of which are expressly incorporated herein by reference.

Figure 2:
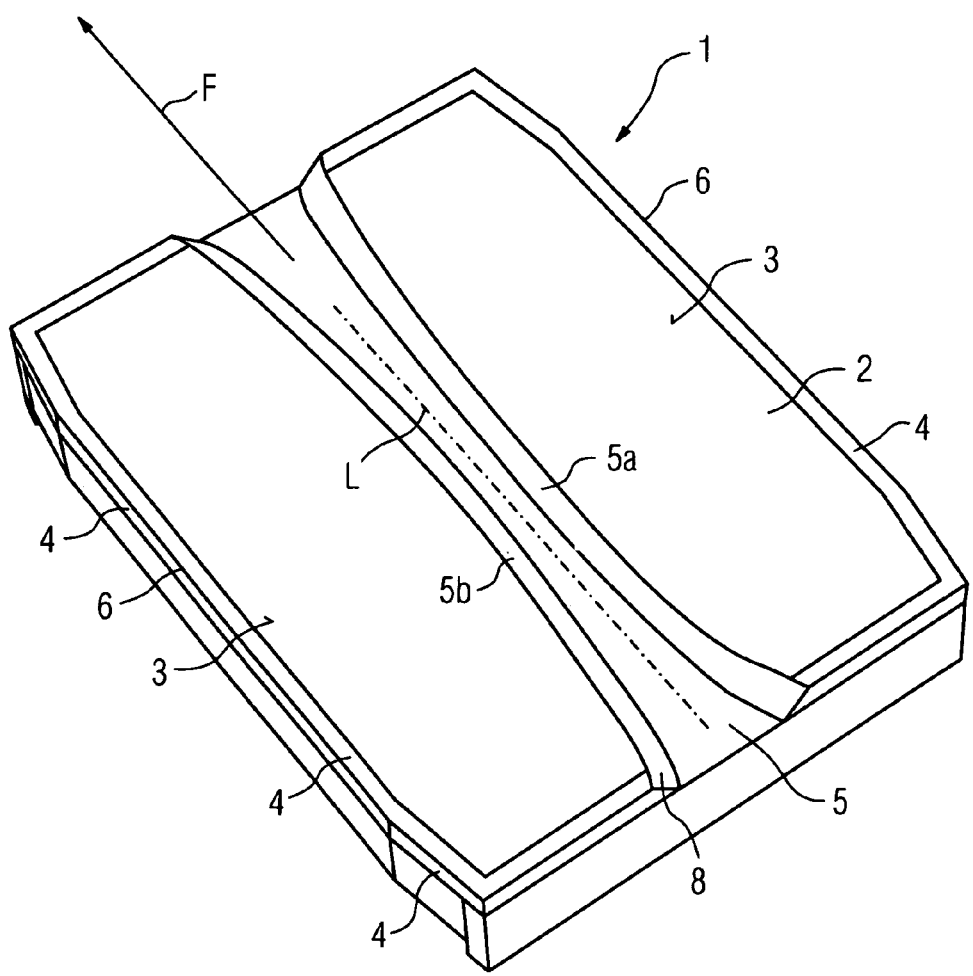
FIG. 2 is a bottom and side perspective illustration of another embodiment of a container according to the present invention.

The sidewalls 5a, 5b extend in mirror-symmetrical relationship to the longitudinal axis L of the container 1 and are outwardly curved in such a manner that a greatest distance between the sidewalls 5a, 5b is defined approximately in mid-section of the container 1. In the leading and trailing zones, as viewed in transport direction F, the sidewalls 5a, 5b and thus the passageway 5 widen gradually outwards to exhibit a funnel-shaped expansion 8 in the leading and trailing zones. As shown in FIG. 2, it is, of course, also conceivable within the scope of the present invention to inwardly curve the sidewalls 5a, 5b of the container 1 in such a manner that a smallest distance between the sidewalls 5a, 5b is defined approximately in mid-section of the container 1.

The curvature of the sidewalls 5a, 5b is also suited to a curved conveyor section of the transport system by corresponding the radius of the curvature to a curve radius of the curved conveyor section.

The engagement assembly engages the passageway 5 in such a way as to at least partially bear upon the sidewalls 5a, 5b. Suitably, the sidewalls 5a, 5b of the passageway 5 are outwardly inclined in relation to the vertical in mirror-symmetric relationship to the longitudinal axis L of the container 1 so that the passageway widens downwards. Although the inclined configuration of the sidewalls 5a, 5b is a currently preferred embodiment, it is, of course, also conceivable within the scope of the present invention to provide sidewalls that extend perpendicular to the underside 3 of the container 1.

As shown in FIG. 3, the transport system is comprised of single transport tracks 9a for conveying the container 1 by means of the engagement assembly a long a transport path 9. Each conveyor track 9a is hereby equipped with a sensor assembly having an inductive sensor 7a placed at the leading end and an inductive sensor 7b placed on the trailing end of each conveyor track 9a. These sensors 7a, 7b detect an arrival and departure of a container 1 on the respective conveyor section to produce corresponding signals for delivery to a control unit 8 for control of operation of the conveyor section immediately following in transport direction F. Structure and operation of such sensors are generally known to the artisan so that a detailed description thereof is omitted for the sake of simplicity.

The container 1 has outer sides 6 which extend in parallel relationship to the longitudinal axis L and are provided with markings 4 in the form of dopants 4 to define doped zones. The doped zones 4 extend continuously from end to end along the outer sides 6 so that the sensors are able to detect the container 1 along the entire length thereof, as the container 1 passes by the sensors. The doped zones 4 exhibit an electric permeability which significantly differs from the permeability of air so as to assure a safe response by the inductive sensors when the doped zones 4 are positioned in the response range of the sensors.

Examples of suitable dopants 4 include lithium, beryllium, carbon or boron, or a mixture of these elements. The dopants 4 are arranged on the outer sides 6 of the container 1 and ensure a slight switching distance to the inductive sensors as the container 1 passes by. When using lithium or beryllium as dopants 4, care should be taken to suitably protect them against air, water and other external influences. Suitably, appropriate areas of the container 1 are enriched with dopants 4. The use of carbon as dopant involves an electrically conductive form such as graphite or carbon fibers.

The afore-mentioned chemical element for use as dopants do not interfere with the screening process, carried out by a screening device 10 (FIG. 3), of baggage loaded onto the container 1 because of their fairly low atomic number. Suitably, the dopant has an effective atomic number which is smaller than 6.5.

As an alternative, the markings 4 may also be realized by attaching metal elements in the form of steel bands along the outer sides 6 of the container 1. In order to assure a response by the sensors, the steel band has a width of 3 cm and a thickness of 1 mm. In this way, the conductivity in the response range of the sensors is sufficiently changed so that the sensors are assured to detect the container 1.

Screening of baggage can be carried out by the screening device 10 without interference as the steel bands are arranged on the bottom 2 in the area of the outer sides 6 of the container 1. Suitably, the steel bands are attached at the underside 3 to the outer edge below the container sidewall. Hereby, the lowest point of the baggage in the concavely shaped trough is still located above the highest point of the steel band, as viewed in vertical direction, when the container 1 is transported.

When the container 1 travels through the screening device 10, such as a tomograph in which the axis X-ray sender—X-ray detector revolves, the X-ray radiation is not impaired by the presence of the steel band as the visible shadow of the X-ray is always situated outside of the baggage item.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A transport system, in particular an airport baggage handling system, comprising:
   a container for receiving an article;
   a sensor assembly including an inductive sensor for controlling a transport of the container along a transport path; and
   a screening device for completely scanning of the article, received in the container, together with the container, wherein the container includes a doped zone so disposed on the container as to pass the sensor assembly in the container's response range.

2. The transport system of claim 1, wherein the doped zone is realized by a dopant having an effective atomic number smaller than 6.5.

3. The transport system of claim 2, wherein the dopant is an element selected from the group consisting of lithium (Li), beryllium (Be), carbon (C), boron (B) and a mixture thereof.

4. The transport system of claim 1, wherein the container includes a metal element so disposed on the container as to pass the sensor assembly in the container's response range.

5. A transport system, in particular an airport baggage handling system comprising:
   a container for receiving an article:
   a sensor assembly including an inductive sensor for controlling a
   transport of the container along a transport path; and
   a screening device for completely scanning of the article, received in the container, together with the container,
   wherein the container has an outer side, and metal element configured in the form of a band on an underside of the container in a region of the outer side.

6. The transport system of claim 5, wherein the band is made of steel.

7. The transport system of claim 5, wherein the container is trough-shaped such that a lowest point of the article, as viewed in a vertical direction, is located above the metal element.

8. A container for receiving an article for movement along a transport system, in particular airport handling system, comprising a container body for receiving an article, said container body having a marking so attached to the container body as to pass a sensor assembly in the container's response range for detection of the container body, said container body being constructed to allow complete scanning of the article together with the container body, wherein the marking is implemented as a doped zone applied on the container body.

9. The container of claim 8, wherein the marking is implemented as a metal element attached to the container body.

10. The container of claim 9, wherein the metal element is constructed in the form of a steel band having a width of 3 cm and a thickness of 1 mm.

11. The container of claim 8, wherein the container body has an underside formed with two sidewalls extending in a transport direction and bounding a grooved passageway extending in the transport direction for engagement by a driving and guide unit which bears upon at least partial area of the sidewalls, said two sidewalls being curved mirror-symmetrically.

12. The container of claim 11, wherein the sidewalls of the passageway are outwardly curved mirror-symmetrically to define a greatest distance between the sidewalls in mid-section of the sidewalls.

13. The container of claim 11, wherein the sidewalls of the passageway are inwardly curved mirror-symmetrically to define a smallest distance between the sidewalls in mid-section of the sidewalls.

14. The container of claim 11, wherein the sidewalls are curved outwardly mirror-symmetrically at a radius which corresponds to a curve radius of a curved conveyor.

15. The container of claim 11, wherein the sidewalls of the grooved passageway extend perpendicular to a bottom side of the container body.

16. The container of claim 11, wherein the sidewalls of the grooved passageway are positioned as mirror images in inclined relationship to form a configuration of the passageway in downwardly expanding direction.

* * * * *